3,210,441
AIR-DRYING UNSATURATED POLYESTER RESINS AND COATING COMPOSITIONS EMPLOYING SAME

Arthur P. Dowling, Lakewood, Donald F. Holicky, Parma, and Robert W. Lottig, Cleveland, Ohio, assignors to The Glidden Company, Cleveland, Ohio, a corporation of Ohio
No Drawing. Filed Sept. 11, 1961, Ser. No. 137,073
20 Claims. (Cl. 260—867)

This invention relates to oxygen-convertible unsaturated polyester resins and/or coating compositions employing their solutions. The resins are characterized by having at least one monohydroxy acetal residue in the chemical structure of the resin molecules, and preferably two of such residues.

It has long been known that many of the unsaturated polyester resins of the past have exhibited air-inhibited curing at their air-contacting surfaces. Several ways to overcome this air-inhibition have already been found heretofore. The present invention stems from the discovery that the presence of esterified residues of monohydroxy acetals in polyester resins of particular formulation are not only free of air-inhibition but are truly oxygen convertible when catalyzed with small effective amounts of soluble cobalt salts.

Thus, one object of the invention is to provide novel air-curing unsaturated polyesters having the particular formulations set forth hereinafter.

Another object is to provide novel air-curing solutions and coating compositions of such resin(s) in copolymerizable monomer(s) and/or in inert solvents.

These and other related objects will be apparent from the following illustrative and explanatory description of the invention.

Briefly, the invention involves preparing enedioyl-type polyesters from (a) polycarboxylic acids such as maleic, fumaric, itaconic, aconitic, etc.; (b) from polyols such as ethylene glycol and other glycols and/or alcohols having two or more hydroxyl groups, and (c) from monohydric acetals of the five-member cyclic type. In such polyesters, the carboxyl groups of the acid(s) are proportioned to esterify substantially all of the hydroxyl groups provided by both the polyol(s) and by the hydroxy acetal(s), and esterification is continued to this end. While the acid(s) and polyol(s) are preferably difunctional, thereby to yield substantially linear polyester molecules, tri-functional or tetra-functional acid(s) and/or polyol(s) can be used. The hydroxy acetals are essentially mono-functional and hence are assumed to provide chain-terminating residues of the polyesters. However, it will be recognized that there is the possibility that at least some of the acetals become ether-linked in intermediate positions by forming ethers with the polyols used in preparing the polyesters.

The ingredients of the polyesters will now be discussed in greater detail under their separate headings.

THE UNSATURATED ACID(S)

These are preferably carboxylic acids of the enedioyl type, i.e., $\alpha$, $\beta$ unsaturated dicarboxylic acids such as maleic, chloromaleic, fumaric, itaconic, mesaconic, citraconic, etc., but other di-, tri- or higher carboxylic acids having an ethylenic double bond conjugated with the double bond of a carboxyl group are useful herein. The acids per se, or their anhydrides (where such exist) are equally useful in the invention, and in the foregoing and subsequent description and definition of the invention the term "acid" is used to refer equally well to an anhydride except where otherwise stated.

In the case of the $\alpha$, $\beta$ unsaturated acids, each of such acids contains a polymerizably reactive $\Delta^{2,3}$-enedioyl group, and a polymerizable unsaturated polyester prepared from any of such acids contains a plurality of such polymerizably reactive $\Delta^{2,3}$-enedioyl groups. In other words, each of the acids contains a group having the structure

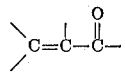

and such groups are contained in dioyl radicals in the polyester molecule; hence the dioyl radicals can be defined as $\Delta^{2,3}$-enedioyl radicals (e.g., butenedioyl or ethenedicarboxylyl radicals). Maleic acid or anhydride will hereinafter be referred to as representing the preferred enedioyl acid, it being preferred because of its present ready availability and its present low cost.

The term "functionality," as used hereinabove and hereafter refers to the number of ester-forming groups of the compound referred to. Thus, a difunctional acid has two esterifiable carboxyl groups, a difunctional alcohol has two esterifiable hydroxyl groups, and a mono-functional hydroxy acetal has one esterifiable hydroxyl group.

A minor portion (i.e., up to about 40 mol percent) of the unsaturated acid(s) can be replaced with saturated and/or aromatic polycarboxylic acids or their chlorinated counterparts, but larger amounts have been found to promote air-inhibition in the curing of the resins and/or their solutions. Typical acids which can be used for the indicated replacement are phthalic, isophthalic, adipic, succinic, azelaic, chlorinated phthalic, tetrahydrophthalic, etc.

THE POLYOL(S)

The polyhydric alcohols which are preferred for use in the invention are diols (glycols) of the polymethylene type and/or of the polyoxyalkylene type. However certain diethylene glycol/maleic/dicyclopentadiene polyester resins described in copending application Serial No. 137,074, filed September 11, 1961, as well as certain diethylene glycol maleates have also been discovered to be air-curing when catalyzed with cobalt. To avoid confusion in the description of the present invention, the polyoxyalkylene glycols will therefore only be included to show that the air-curing qualities of the acetal resins are not impaired and are actually accelerated in their air-drying rates by the polyoxyalkylene glycols. This limited inclusion of the latter glycols should not be construed as a limitation on the invention, but instead should be recognized as an effort by applicants to describe the present invention without involving air-curing qualities which could be attributed to the polyoxyalkylene glycol resins instead of to the hydroxy acetal residues. It will be obvious that where two different structures confer air-drying qualities, a formulation which involves both cannot be said with certainty to have air-dried because of either one alone.

The polyols used in preparing the polyester resins (not the acetals) of the invention can include trihydric alcohols (e.g., glycerine, trimethylolpropane, trimethyloleth-ane, trimethylolbutane, etc.) or tetrahydric alcohols such as pentaerythritol, but such polyols induce the formation of three-dimensional molecules and hence increase the difficulty of avoiding premature gelation of the mass being esterified before a product of desired low acid number or low hydroxyl content has been secured. Hence, for practical purposes, any such tri- or tetra-hydric polyols should be limited to minor amounts (i.e., up to about .4 molar percent) of the total polyol component, with the remainder consisting essentially of glycols. The preferred polymethylene glycols and/or polyoxyalkylene glycols are those having up to 8 carbon atoms, including unsaturated glycols such as 2-butene, 1,4 diol.

THE HYDROXY ACETAL(S)

These are cyclic reaction products secured by condensation of an aldehyde with two vicinal hydroxyl groups of one or more trihydric straight chain alcohols. In such condensations, one mol of water is liberated and the resulting structure can be represented as follows:

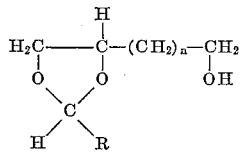

where R is any monovalent hydrocarbon or halohydrocarbon group or is hydrogen, and where $n$ is 0–3. Thus, the aldehyde(s) used in preparing the acetals of the invention can be any hydrocarbyl aldehyde(s) and/or halohydrocarbyl aldehyde(s), whereby R in the above formula can be an alkyl, a cycloalkyl or an aromatic group with or without halogen substituents thereon. We presently prefer to use formaldehyde (or a compound like paraformaldehyde or trioxymethylene which decomposes to formaldehyde, whereby R in the formula is H), acetaldehyde, chloral and/or bromal since the acetals formed from these aldehydes for some reason not fully elucidated yield polyesters having higher viscosities than do otherwise identical polyesters containing cyclic acetals made with aldehydes composed of more than 2 carbon atoms. Moreover, the chloral or bromal acetals reduce the flammability of the polyesters. However, the higher saturated and/or aromatic aldehydes and their halogenated derivatives, such as butyraldehyde, heptoic aldehyde, benzaldehyde, valeraldehyde, vanillin, furfural, tolualdehyde, etc. can nevertheless be used beneficially to improve the solvent and/or monomer solubility of the polyesters.

Polyols useful in preparing the present monohydric cyclic acetals are the aliphatic triols responding to the alcohol(s) of the above formula, glycerine and 1,2,6-hexanetriol being presently preferred. The vicinal hydroxyls of these triols (one a primary hydroxyl and the other a secondary) permit preparation of the only monohydric cyclic acetals which confer air-drying properties to the unsaturated polyesters of our invention. Trimethylolethane and trimethylolpropane form homologous monohydric cyclic acetals but such homologues have been found to be ineffective in conferring air-drying to our polyesters.

PREPARATION OF THE UNSATURATED POLYESTERS

The acid(s), the polyhydric alcohol(s) and the already-prepared monohydric cyclic acetals are charged to an esterification kettle in the following substantially stoichiometric esterifying proportions:

Unsaturated acids with or without up to
  40 mol percent of saturated acids,
  aromatic acids and/or the chlorinated
  counterparts of each _____ 1 equiv. in toto.
Polyol(s)—Monohydric cyclic acetals _ .95–1.05 equiv.

The charged mixture is blanketed with an inert gas such as carbon dioxide or nitrogen and thereafter kept blanketed. Inert volatile solvent, such as xylene, toluene, etc., then can be added in amounts appropriate for establishing and/or controlling the viscosity, to secure easy working and/or appropriate for azeotropic removal of the water liberated by esterification of the reactive mass. Polymerization inhibitor(s) can be added at the beginning or at any subsequent time to assist in preventing premature gelation. Quinone is a typical inhibitor but any of the many known inhibitors used in unsaturated polyester/monomer solutions can be used. Esterification catalyst(s), such as non-oxidizing mineral acids, aromatic acids, etc. (e.g., paratoluenesulfonic acid) can be added to assist in securing polyesters of low acid number.

The charged mass is then heated to esterification temperature with azeotropic or equivalent removal of liberated water, and heating is continued until the acid number has been reduced to a desired low value under 60, more preferably under 40.

The reacted mass can then be stripped of volatile solvent, if desired, or can simply be cooled and used in the form of a solution in said solvent. Where unsaturated polyester solutions are desired, the reacted mass, stripped or not of cooking solvent, can be cooled somewhat and thinned with the desired monomer(s) and or inert solvent(s). Usually it is prudent to add additional inhibitor(s) just prior to adding any such monomer(s).

THE COPOLYMERIZABLE MONOMERS

As pointed out above, the unsaturated polyesters per se exhibit air-drying properties and can be used for many purposes such as for impregnation, lamination, casting, molding, free-films, etc., or as or in coating compositions. Solutions of the unsaturated polyester(s) in copolymerizable monomers with or without inert solvent(s) and/or in inert solvents alone can be used for the same or like purposes. Where one or more unsaturated liquid monomer is used for dissolving said polyesters to provide air-drying polyester/monomer solutions, any of the ethylenically unsaturated liquid monomers known in the polyester/monomer art can be used, such as dialkyl maleates, dialkyl fumarates, etc., or monomers having a $CH_2\!\!=\!\!C\!<$ group in their structure such as vinyl aromatics, e.g., styrene, α-methyl styrene, vinyl toluene, divinyl benzene, etc.; unsaturated monocarboxylic esters such as the lower alkyl acrylates, crotonates, methacrylates, glycol dimethacrylates, etc.; unsaturated esters of aromatic and/or saturated aliphatic acids, such as diallyl phthalate, diallyl glycollate, vinyl acetate, vinyl butyrate, etc.; unsaturated ethers such as diallyl ether, vinyl allyl ether, methy vinyl ether, etc.; unsaturated hetero monomers such as triallyl cyanurate; and a host of other classes and/or species of classes involving one or more of said $CH_2\!\!=\!\!C\!<$ groups.

CURING THE UNSATURATED POLYESTER(S) AND/OR THEIR SOLUTIONS

To secure the air-curing effects described hereinabove, it is necessary that small effective amounts of cobalt salt(s) be dissolved in the resin(s) and/or resin solutions. Other metal-type drier salts can be used along with one or more of the cobalt salts, such as lead, manganese, zirconium, etc. salts. It should be recognized that peroxidic, azo and/or ozonide catalysts are not necessary. They can be added, however, to assist in accelerating the rate of cure, where desired, in amounts of 0.005–1.5% by weight.

The cobalt salt(s) serve somehow to promote oxygen-convertibility; where peroxide and/or like catalysts are also present, the cobalt salt(s) promote the in-situ formation of free radicals derived from said catalysts. Other metal drier-type salts alone cannot be substituted for cobalt salt(s), but can in some instances be used along with cobalt salt(s) for beneficial effects. Amounts of cobalt from .05–1% by wt. are practical amounts.

The following examples illustrate the principles of our invention and include the best modes presently known to us for practicing those principles.

*Example 1.—Hexanetriol/formal/propylene glycol/ maleic polyester*

The formaldehyde acetal of hexanetriol is prepared from the following materials:

|  | G. |
|---|---|
| 2 mols 1,2,6-hexanetriol | 268.0 |
| 2 mols paraformaldehyde (91% purity) | 66.0 |
| .1 mol maleic anhydride | 9.8 |

The materials are charged to a 3-neck flask along with about 2% xylene by wt. (as azeotroping solvent). A reflux column with side-arm water trap is connected. The charged mass is heated for 2–3 hours at 230° F.–400° F. under reflux with removal of water and return of xylene, until 2 mols of water plus the water-impurity in the paraformaldehyde have been removed. The product is left in the flask for the next step of preparing a polyester resin. For this step, the following materials are charged:

| | G. |
|---|---|
| 1 mol propylene glycol | 76.0 |
| 1.9 mols maleic anhydride | 186.2 |

At the time of charging said materials the product in the flask has a temperature of about 300° F. Heating is resumed with reflux and removal of water, and is continued until the acid number of the mass in the flask has been brought down to about 25. This requires about 16 hours of refluxing. The polyester preparation is then complete.

If one desires to remove the xylene, the mass can be sparged with inert gas such as carbon dioxide or nitrogen, or the mass can be vacuum distilled. The resulting polyester can then be thinned with any desired copolymerizable liquid monomer capable of dissolving the polyester, such as styrene, vinyl toluene, diallyl phthalate, etc.

If desired, however, the polyester (either containing the xylene or free of it) can be thinned (dissolved) with desired volatile inert solvent, thereby to prepare, for example, polyester/inert solvent coating solutions.

*Example 2.—Preparation and characteristics of the formal acetal of hexanetriol*

A larger batch of the hexanetriol formal of Example 1 is prepared from the following materials:

| | G. |
|---|---|
| 2 mols (×60) 1,2,6-hexanetriol | 16,080 |
| 2 mols (×60) paraformaldehyde (91% purity) | 3,960 |
| .1 mol (×60) maleic anhydride | 588 |
| Total | 20,628 |

The materials are charged along with 2% by weight of xylene and reacted in the manner described in Example 1 except that a longer refluxing time is needed. The water actually collected amounts to 2500 g.

| | G. |
|---|---|
| Actual yield of acetal (stripped of xylene) | 18,218 |

The theoertical water loss should be:

| | |
|---|---|
| From impure paraformaldehyde | 354 |
| From acetal formation | 2,160 |
| | 2,514 |

The reacted mass is stripped of solvent by vacuum distillation, to give the indicated yield of acetal. The finished acetal has a hydroxyl number of 12.3 (vs. 12.6 by theory) and an acid number of 7.3 due to the small amount of maleic anhydride used for catalyzing the condensation. Infra-red analysis indicates the condensed product to have the following structure:

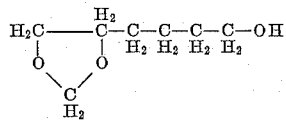

Such a compound has a molecular weight of 146, and an equal hydroxyl equivalent weight.

*Example 3.—Hexanetriol butyral/ethylene glycol/ maleic polyester*

The butyraldehyde acetal of 1,2,6-hexanetriol is prepared from the following materials:

| | G. |
|---|---|
| 2 mols 1,2,6-hexanetriol | 268.0 |
| 2 mols n-butyraldehyde | 144.0 |
| .1 mol maleic anhydride | 9.8 |

The materials are charged along with 2% by weight of xylene and then processed as described in Example 1. Then the following materials needed for polyester formation are charged to the hot acetal.

| | G. |
|---|---|
| 1.0 mol ethylene glycol | 62.0 |
| 1.9 mols maleic anhydride | 186.2 |

The charged mass is processed in the manner described in Example 1 except that the mass is esterified to an acid number of about 9 because the butyral polyesters are considerably lower in viscosity or body than the corresponding formal polyesters. The polyester can be stripped of xylene or can be used without stripping, as shown hereafter.

*Example 4.—Hexanetriol/butyral/trimethylolpropane/maleic polyester*

A butyraldehyde acetal of 1,2,6-hexanetriol is prepared from the materials and in the manner described in Example 3. Then while it is still hot the following materials are charged:

| | G. |
|---|---|
| .67 mol trimethylolpropane | 89.8 |
| 1.9 mols maleic anhydride | 186.2 |

The resulting mass in the flask is esterified in the manner described in Example 3 except that the acid number is brought down to about 7.

*Example 5.—Hexanetriol/benzal/propylene glycol/ maleic polyester*

The benzaldehyde acetal of 1,2,6-hexanetriol is prepared in the manner described in Example 1 by using the following materials:

| | |
|---|---|
| 2 mols 1,2,6-hexanetriol g | 268.0 |
| 2 mols benzaldehyde g | 212.3 |
| .1 mol maleic anhydride g | 9.8 |
| Xylene percent by wt | 2 |

Then while the acetal is still hot, the following materials are charged:

| | G. |
|---|---|
| 1 mol propylene glycol | 76.0 |
| 1.9 mols maleic anhydride | 186.2 |

The resulting mass is esterified in the manner described in Example 1 except that the acid number is brought down to about 3, because, like the hexanetriol/butyral polyesters, the hexanetriol/benzal polyesters are low in viscosity compared with the corresponding formal polyesters.

*Example 6.—Air-inhibited acetal/propylene glycol maleic polyesters*

While the products formed in this example are not part of the present invention, their preparation is here described so that the tested coatings described subsequently can be properly evaluated in comparison with the air-drying polyester coatings of the invention.

Formaldehyde acetals of trimethylolpropane and trimethylolethane are prepared separately in the manner described in Example 1 from:

A.

| | |
|---|---|
| 2 mols trimethylolpropane g | 134.0 |
| 2 mols paraformaldehyde (91% purity) g | 66.0 |
| .1 mol maleic anhydride g | 9.8 |
| Xylene percent by wt | 2 |

B.

| | |
|---|---|
| 2 mols trimethylolethane g | 121.0 |
| 2 mols paraformaldehyde (91% purity) g | 66.0 |
| .1 mol maleic anhydride g | 9.8 |
| Xylene percent by wt | 2 |

Then while the separate acetals are still hot, the following materials are charged to each:

| | G. |
|---|---|
| 1 mol propylene glycol | 76.0 |
| 1.9 mols maleic anhydride | 186.2 |

The resulting masses are esterified in the manner descirbed in Example 1, with the xylene being left in both.

*Example 7.—Glycerine formal/propylene glycol/maleic polyester*

In this example glycerine and formaldehyde are reacted to form the glycerine/formal acetal. The materials used are:

| | |
|---|---:|
| 2 mols glycerine (99% purity) _____g__ | 184.0 |
| 2 mols paraformaldehyde (91% purity) _____g__ | 66.0 |
| .1 mol maleic anhydride _____g__ | 9.8 |
| Xylene _____percent by wt__ | 2 |

The materials are charged and processed in the manner described in Example 1, thereby to form the desired monohydric acetal. While the reaction mass is still hot, the following materials are charged:

| | G. |
|---|---:|
| 1 mol propylene glycol _____ | 76.0 |
| 1.9 mols maleic anhydride _____ | 186.2 |

The resulting mass in the flask is esterfied in the manner described in Example 1, to secure an acid number of about 21. The xylene is stripped off by vacuum distillation.

The polyester so secured has somewhat limited solubility in copolymerizable monomers and/or in solvents, but can nevertheless be dissolved in either or both to form useful solutions which can be air-dried (see Example 12). To improve solubility, dicyclopentadiene in amounts up to 0.45 mol (based on the $\alpha,\beta$ unsaturated polycarboxylic acid) can be added to the flask when preparing the polyester. Such use of dicyclopentadiene in our polyesters also imparts added flexibility to the resin (see Example 13).

*Example 8.—Styrene solutions of certain of above examples*

Portions of the polyester resins of Examples 1, 3, 4, 5, 6A, and 7 were stripped of xylene and then were cooled to about 240° F. and inhibited with .005% p-quinone. Monomeric styrene was then added to each to secure solutions containing about 70% polyester and 30% styrene, by wt. (where possible). The viscosities of the resulting solutions were measured, as shown below. For ease in applying as coatings, the solutions were then further thinned with styrene to secure solutions composed of about 54% polyester and 46% styrene. The latter solutions were catalyzed with the following materials:

1 oz. per gallon of methyl ethyl ketone peroxide solution (60% conc. in 40% dimethyl phthalate; 9.08 lbs./gal.)
1 oz. per gallon of cobalt octoate (12% cobalt by wt.) (100% solids; 8.8 lbs./gal.)

Films of the catalyzed solutions were applied on glass and allowed to cure at room temperature overnight. The following tabulation distinguishes between the air-drying and the air-inhibited polyester/monomer solutions.

| Polyester of Ex. | Viscosity [1] of 70/30 sol'n. | Condition of cured films applied from 54/76 solutions | | |
|---|---|---|---|---|
| | | Tack free | Mar resis. | Resistant to attack by ketone solvents |
| 1 | V–W | Yes | Yes | Yes. |
| 3 | E–F | Yes | Yes | Yes. |
| 4 | J | Yes | Yes | Yes. |
| 5 | J | Yes | Yes | Yes. |
| 7 | Insoluble | | | (See Example 12) |
| 6A(TMP)[2] | G–H | No | No | No. |
| 6B(TME)[3] | W | No | No | No. |

[1] Gardner-Holdt Scale, 25° C.
[2] Trimethylolpropane acetal.
[3] Trimethylolethane acetal.

*Example 10*

Portions of the xylene-free polyester of Example 3 were inhibited with .005% p-quinone and then were thinned (dissolved) at about 240° F. with the various monomers shown below to form solutions containing about 70% polyester and 30% monomer. The viscosity of each solution was then determined (Gardner-Holdt, 25° C.). Then the solutions were catalyzed with 1 oz. per gallon of both methyl ethyl ketone (MEK) peroxide [*] and cobalt octoate (12% cobalt, by wt.) and films were applied on glass and allowed to cure overnight at room temperature. The following table summarizes the results.

| Monomer | Viscosity 70/30 sol'n. | Condition of cured films | | |
|---|---|---|---|---|
| | | Tack free | Mar. resis. | Resistant to attack by ketone solvents |
| Vinyl toluene | I | Yes | Yes | Yes. |
| Diallyl phthalate | W | Yes | Yes | Yes. |
| Ethylene glycol dimethacrylate | T | Yes | Yes | Yes. |
| Methyl methacrylate | C | Yes | Yes | Yes. |
| Butyl methacrylate | C | Yes | Yes | Yes. |
| 2-ethyl hexyl acrylate | G | Yes | Yes | Yes. |

*Example 11*

This example illustrates the use of our air-drying polyesters without monomer but dissolved in inert volatile solvents.

The molten xylene-containing polyester of Example 1 was reduced to 60% solids content by wt. with a 50/50 mixture of xylene and toluene and then portions were used (with or without catalysts as noted below) to cast films on glass. The applied films were allowed to cure at room temperature. The following table summarizes the conditions employed in the tests, and the observed results secured therefrom:

| Test | Film was cast with added— | | Condition of film |
|---|---|---|---|
| | Cobalt octoate | MEK* peroxide | |
| A | None | None | Tacky after several days. |
| B | 1 oz./gal. (12% Co) | ____do____ | Dry, hard and solvent resistant after 24 hours. |
| C | 1 oz./gal. (12% Co) | 1% by wt. | Harder and tougher than B; also dried much faster than B to the tack-free point. |

*Methyl ethyl ketone; 60% solution, supra.

*Example 12*

This example illustrates the use of both inert solvents and monomers to prepare coating compositions air-drying at a conventional force-drying temperature of 135° F.

The polyesters of Examples 1 and 7, while molten and stripped of xylene were thinned (dissolved) with a 50/50 mixture of xylene and butanol to secure solutions having 50% resin solids by weight. The resulting solutions were catalyzed with 0.25 liquid oz./gal. of 6% cobalt naphthenate [1] and with 1 oz./gal. of methyl ethyl ketone peroxide [2] while at the same time adding the monomer(s) indicated below to secure aliquots in which the ratio of polyester resin solids to monomer varied between 90/10 and 70/30. The various aliquots so secured were used to cast films on glass, after which each

[*] 60% solution, supra.
[1] 100% solids; 8 lbs./gal.
[2] 60% solution, supra.

coated panel was force-dried for one hour at 135° F. The following table summarizes the results.

| Test | Monomer(s) used | Condition of force-dried films | | |
|---|---|---|---|---|
| | | Tack free | Mar resistant | Solvent resistant |
| A₁ | Diallyl phthalate | Yes | Yes | Yes |
| A₇ | ___do___ | Yes | Yes | Yes |
| B₁ | Ethylene glycol dimethacrylate | Yes | Yes | Yes |
| B₇ | ___do___ | Yes | Yes | Yes |
| C₁ | Equal parts of A and B | Yes | Yes | Yes |
| C₇ | ___do___ | Yes | Yes | Yes |

*Example 13*

As indicated in Example 8, the polyester of Example 7 (using a glycerine/formal acetal) was insoluble in styrene at a 70 resin/30 styrene reduction. This example illustrates the use of dicyclopentadiene (85–100% purity) in such a polyester to improve its solubility in styrene.

A glycerine/formaldehyde acetal is prepared in the manner described in Example 7 except that toluol was used as the reflux solvent instead of xylene.

While the prepared acetal is still hot, the following materials are charged:

|  | G. |
|---|---|
| 1 mol propylene glycol | 76.0 |
| 1.9 mols maleic anhydride | 186.2 |
| .9 mol dicyclopentadiene * | 119.0 |

*Commercial "90% topped" grade which is typically 90% dicyclopentadiene (minimum 85%); specific gravity .974–.980; initial boiling point (ASTM Std. Distillation) 95° C. minimum, typically 105° C.; other ingredients are mainly lower alkylated dicyclopentadienes.

The resulting mass in the flask is esterified in the manner described in Example 1 to secure an acid number of about 22. The toluol is then stripped off by vacuum distillation, after which the resinous mass is cooled to about 240° F. and inhibited with .005% p-quinone. The inhibited resin is then thinned by adding styrene to secure a solution composed of 70% resin/30% styrene. The viscosity of the solution (Gardner-Holdt, 25° C.) is N, and the solution weighs about 9.0 lbs./gal.

When the styrene solution is catalyzed with soluble cobalt salt (cobalt octoate, 12% Co) added at the rate of 1 liquid oz./gal. and a film is cast on glass, the film air-dries to a hard, mar-resistant and solvent-resistant condition.

Another coating solution is made by dissolving 85 parts of the resin, 15 parts diallyl phthalate and a 50/50 mixture of xylene and butanol together to prepare a solution having 70% solids (resin plus diallyl phthalate). When this solution is catalyzed as above and a film is laid down, the film air-dries to a hard, mar-resistant and solvent resistant condition.

*Example 14*

This is an example illustrating the preparation of an air-drying ethylene glycol/maleic polyester having in its molecules an average of two residues of a 1,2,6-hexanetriol/formaldehyde acetal, and illustrating the use of such air-drying polyester in a pigmented, thixotropic coating composition adapted for general trade usage when applied over a catalyst-containing basecoat.

The 1,2,6-hexanetriol/formaldehyde acetal is prepared from the kinds and amounts of materials and in the manner described in Example 1 except for the replacement of the xylene thereof with toluene as azeotroping solvent.

After the acetal has been prepared and is still hot in the flask, there is charged:

|  | G. |
|---|---|
| 1 mol ethylene glycol | 62.0 |
| 1.9 mols maleic anhydride | 186.2 |

The mass is then esterified with removal of liberated water until the acid number is brought down to about 19. The toluol is stripped off, and the resulting resin is cooled to about 240° F. and inhibited by adding about .005% (wt.) of p-quinone. Styrene is then added to the flask to reduce the resin to a solution having a resin solids content of 68%. The solution is then allowed to cool to room temperature and retained for later use in preparing a coating composition. The solution has a Gardner-Holdt viscosity at 25° C. of T–U, a Gardner color of 6, weighs about 9.25 lbs./gal., is stable at 135° F. for 6 days and has the following SPI (Society of Plastics Industry) standard test ratings:

| Gel time | minutes | 4 |
|---|---|---|
| Reaction time | do | 5 |
| Peak exotherm | ° F | 432 |

When catalyzed with small amounts of cobalt salt, a film air dries to a mar- and solvent-resistant condition.

A coating composition using the above resin solution is formulated as follows:

| A. Titanium dioxide | lbs | 138 |
|---|---|---|
| B. Bentonite thickener (Bentone 27) | lbs | 23 |
| C. Magnesium silicate | lbs | 69 |
| D. Above resin solution | gals | 86.2 |
| E. Styrene | gals | 5.7 |
| F. Cobalt octoate (12% Co) | gals | 0.35 |
| G. Dimethylsilicone oil (antifoam) | gals | 0.35 |

Materials A–F inclusive are charged to a roller mill and ground to a 7–8 grind (Hegeman gauge). Material G is added just before discharging the mill into containers. The finished coating composition weighs about 10.95 lbs. per gal., has a viscosity (75° F.) of about 135 KU, and is applied full body over any desired catalyzed basecoat (such as unplasticized nitrocellulose modified with 4 liquid ounces per gallon of methyl ethyl ketone peroxide *). The use of a catalyzed basecoat in connection with the curing of an applied polyester topcoat is described and claimed in copending application Serial No. 663,600 filed June 5, 1957.

The white polyester coating applied to such a catalyzed basecoat air-dries to a hard film having a mar resistant and solvent-resistant surface and affording excellent protection to the substrate.

*Example 15*

In the above examples, the polyesters are formulated to provide an average of two acetal residues per molecule. This example illustrates the preparation of an air-drying polyester having an average of only one acetal residue per polyester molecule.

An acetal is prepared from:

| 1 mol 1,2,6-hexanetriol | g | 134.0 |
|---|---|---|
| 1 mol paraformaldehyde (91% pure) | g | 33.0 |
| .10 mol maleic anhydride | g | 9.8 |
| Toluol (wt.) | percent | 2 |

The acetal is prepared in the manner described in Example 1, and then is reacted into a polyester by charging into the same flask

|  | G. |
|---|---|
| 2.90 mols maleic anhydride | 284.2 |
| 2 mols propylene glycol | 152.0 |
| 1 mol cyclol ** | 124.0 |

**A monohydric alcohol used as chain terminator; formula shown below.

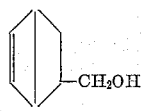

*60% solution, supra.

The mass is esterified with removal of liberated water, in the manner described in Example 1, until the acid number has been brought down to about 50. The toluol is stripped off, and the mass cooled to about 240° F. The resin is then inhibited with .005% p-quinone and 0.25% of a propylene glycol (80 wt. percent)/acetamidine hydrochloride (20 wt. percent) solution. Styrene is then added to the flask to reduce the resin to a resin solids content of 65 wt. percent. The resulting solution has a viscosity (Gardner Holdt, 25° C.) of T–U, a Gardner color of 2–3, and exhibits the following SPI standard test ratings:

Gel time _____ 7'34".
Reaction time _____ 9'26".
Peak exotherm _____ 443° F.

When the styrene/resin solution is catalyzed with cobalt octoate (12% Co) at the rate of about 1 oz. per gallon, a cast film thereof air-dries slowly at room temperature and more rapidly at 135° F. The dry film has a Barcol hardness of 35 and is mar- and solvent-resistant, thereby showing its freedom from air-inhibition.

Similar results are secured when the cyclol is replaced with 1 mol of 2-ethyl hexanol and the polyester is esterified until the acid number has been brought down to about 17.

Example 16

An air-drying polyester is secured when the propylene glycol of Example 1 is replaced with 1 mol of 2-butene-1,4-diol and the polyester is esterified until the acid number has been brought down to about 40. The air-dried film is, however, softer than the corresponding propylene glycol polyester film.

Example 17.—A filler for wood

The air-drying resins of Examples 1, 3, 4, 5 and 7 as well as others can be used separately or in admixture as the binder component of wood fillers. A typical formulation for a walnut filler follows:

|  | Lbs. |
|---|---|
| Solution of 70 wt. percent of above resin(s) in 30 wt. percent ethyleneglycol monomethyl ether acetate (a solvent of slow evaporation rate) ___ | 4.2 |
| Ethyleneglycol monomethyl ether acetate _____ | 1.8 |
| Solvesso No. 3 * _____ | 1.0 |
| Silica _____ | 8.0 |
| Asbestine _____ | 3.0 |
| Burnt umber _____ | 0.437 |
| Bone black _____ | 0.125 |
| Van Dyke brown _____ | 0.125 |
| Raw sienna _____ | 0.125 |
| Burnt sienna _____ | 0.015 |
| Carbon black _____ | 0.015 |
| Wt./gal. _____ | 13.65 |

*Aromatic petroleum naphtha; refractive index at 20° C., 1.4830, KB value 66–70; initial boiling point 350° F., 50%-over point 365–380° F., dry point 398°–425° F.; flash point 130° F.

In use, the filler is reduced at the rate of one pound of filler to one pint of the following reducer:

|  | Gals. |
|---|---|
| Ethyleneglycol monomethyl ether acetate _____ | 70 |
| Solvesso No. 3, above _____ | 25 |
| Cobalt octoate (12% Co) 8.8 lbs./gal_____ | 2.5 |
| Zirconium naphthenate (6% Zr) (7.8 lbs./gal.) ____ | 2.5 |

Example 18

An unsaturated polyester duplicating that of Example 1 is prepared except that the acetal thereof is prepared by replacing the paraformaldehyde of Example 1 with two mols of chloral.

The resulting polyester exhibits reduced flammability and is otherwise equally air-drying when laid down as a film (a) from an inert volatile organic solvent single-phase solution, (b) from a single-phase solution containing dissolved cobalt salt and in which the solvent component is a mixture of inert volatile organic solvent and copolymerizable ethylenically-unsaturated normally-liquid monomer, or (c) from a single-phase homogeneous solution composed of said polyester, dissolved cobalt salt and copolymerizable, normally-liquid, ethylenically-unsaturated monomer.

Examples 19.—Exterior house paints

Exterior house paints using our air-drying polyesters alone or with diallyl phthalate as the film-formers are formulated as shown:

|  | G. |
|---|---|
| Titanium dioxide _____ | 352 |
| Magnesium silicate _____ | 100 |
| Calcium carbonate _____ | 132 |
| Clay _____ | 100 |
| Silica gel aerosol filler _____ | 100 |
| Maleic/diethyleneglycol/hexanetriol acetal polyester of Example 3 at 80% resin solids in xylene _____ | 1000 |
| Xylene _____ | 240 |

Charge above ingredients to a pebble mill and mill 12–14 hours; drain from mill and add:

|  | G. |
|---|---|
| Polyester of Example 3 at 80% solids in xylene ____ | 400 |
| Xylene _____ | 364 |
| Denatured ethyl alcohol _____ | 111 |

Per resulting gallon of product add:

|  | Liq. oz. |
|---|---|
| Cobalt octoate (12% cobalt) _____ | ½ |
| Methyl ethyl ketoxime (anti-skin agent) _____ | ¼ |
| Coconut oil alkyd,* 100% solids (as leveling agent) __ | 2 |

* Prepared in accordance with Example 1 of U.S. Patent 2,437,657 by replacing the capric acid thereof with whole coconut oil acids.

The resulting paint can be used without further modification as an exterior white house paint having good durability (i.e., weathering resistance) when applied over suitably primed wood, masonry, stucco, etc. We prefer to use a primer of the synthetic resin emulsion type, such as commercial polyvinyl acetate emulsion primers.

The above paint can also be modified with diallyl phthalate monomer in amounts up to about 20% by weight, based on the resin solids of the above paint. When so modified, a peroxide catalyst is added; e.g., one liquid oz. per gallon of methyl ethyl ketone peroxide. (60% solution, supra.)

The modified and unmodified paints dry hard overnight. Exposure tests have demonstrated their good exterior durability.

From the foregoing examples it will be evident that the chemical incorporation of one or two residues of our identified acetals per molecule of polyester confer air-drying qualities to otherwise air-inhibited polyesters of conventional formulation. When desired, the acetal residue(s) can also be incorporated into air-drying polyesters of the types which are air-drying in the absence of the acetal residue(s). Thus the allyl ether type polyester of U.S. Patent 2,852,487 can be modified with one or more of our acetal residues. Likewise they can be incorporated in diethyleneglycol maleate polyesters or in diethyleneglycol/maleic/dicyclopentadiene polyesters of the kinds described and claimed in copending application Serial No. 137,074 filed September 11, 1961.

It will be noted also that our acetal-type air-drying polyesters can be formulated from various α,β unsaturated dicarboxylic acids or equivalently unsaturated polycarboxylic acids, from various glycols with or without monohydric alcohols and with or without monocarboxylic acids, thereby to secure air-drying resins having desired solubility qualities, desired flexibility qualities and desired light, heat, flame and/or exposure resistance. Mixtures of our acetals, mixtures of unsaturated acids alone or with the indicated amounts of saturated and/or aromatic acids, mixtures of polyols, mixtures of monocarboxylic acids and/or mixtures of monohydric alcohols can be employed in formulating the air-drying polyesters, thereby making it possible for one skilled in the art to use much if not all of the prior unsaturated polyester resin art to secure an acetal-modified resin meeting his requirements for rate of air-drying, for physical properties, for resistance qualities, for monomer and/or solvent solubility, etc. Such resins can then be used by themselves as film-formers, as solidifiable liquid products for casting, molding, etc., or for any of the many purposes to which polyesters have already been applied in the prior art.

It will be understood, of course, that the outstanding characteristic of our resins is their unexpected air-drying quality. Where one wants to use the resins for purposes not involving this quality (e.g., potting, casting, molding, etc.) then of course they can be converted from their initially liquid or solution state to the solid state by using any of the unsaturated polyester non-cobalt promoter/catalyst curing systems. In other words, for such purposes the resins need not be catalyzed with cobalt salt(s), since the cobalt salt(s) are needed only when one desires air-drying.

Accordingly, the present invention is directed broadly to novel polyhydric alcohol/polybasic acid polyesters which include specified minimum amounts of ethylenically unsaturated polycarboxylic acids in their make up and which additionally include one or more residues of our identified acetals. When formulated in accordance with the specifications set forth hereinabove the resins will inherently possess air-drying qualities, and this inherent quality can be turned to use by catalysis with cobalt salt(s) or can be ignored in favor of other qualities possessed by the resins.

Having described our invention, what we claim is:

1. An unsaturated resinous polyester which consists essentially of the esterification product of substantially stoichiometric esterifying proportions of $\alpha,\beta$ unsaturated polycarboxylic acid, with polyhydric alcohol and with monohydric cyclic acetal, such that about 0.95–1.05 equivalents of carboxyl group are reacted with about 1 equivalent of hydroxyl groups and such that there is an average of at least one esterified residue of monohydric acetal per molecule of polyester, said acetal having 5 atoms in its cyclic structure and being a condensation product of (a) an aldehyde selected from the group consisting of formaldehyde, saturated hydrocarbyl aldehydes and saturated halohydrocarbyl aldehydes and (b) a trihydric, aliphatic, straight chain alcohol of 3–6 carbons having a pair of vicinal hydroxyl groups, one of said pair being a primary hydroxyl and the other being a secondary hydroxyl, said unsaturated polyester having an acid number below about 60.

2. An unsaturated polyester as claimed in claim 1 which has been dissolved in inert volatile solvent.

3. An unsaturated polyester as claimed in claim 1 which has been dissolved in a mixture of inert volatile solvent and normally-liquid, copolymerizable, ethylenically-unsaturated monomer, and contains dissolved cobalt salt.

4. An unsaturated polyester/monomer solution as claimed in claim 3 wherein the monomer has a $CH_2=C<$ group in its structure.

5. An unsaturated polyester as claimed in claim 1 which has been dissolved in normally-liquid, copolymerizable ethylenically-unsaturated monomer, and contains dissolved cobalt salt.

6. An unsaturated polyester/monomer solution as claimed in claim 5 wherein the monomer has a $CH_2=C<$ group in its structure.

7. An unsaturated polyester as claimed in claim 1 wherein the $\alpha,\beta$ unsaturated polycarboxylic acid is $\alpha,\beta$ unsaturated dicarboxylic acid and constitutes at least 60 mol percent of all polycarboxylic acid therein, any remainder consisting of dicarboxylic acids selected from the group consisting of saturated dicarboxylic acids, aromatic dicarboxylic acids, and mixtures thereof, and wherein the acid number of the resinous polyester is below about 40.

8. An unsaturated polyester as claimed in claim 7 wherein the polyhydric alcohol contains at least 60 mol percent, based on the total polyhydric alcohol, of at least one glycol having up to 8 carbon atoms and selected from the group consisting of polymethylene glycols, polyoxyalkylene glycols, and mixtures thereof.

9. An unsaturated polyester as claimed in claim 8 wherein the trihydric aliphatic alcohol used to prepare the said monohydric cyclic acetal is selected from the group consisting of glycerine, 1,2,6-hexanetriol and mixtures thereof, and wherein the aldehyde used to prepare the said acetal is selected from the group consisting of aldehydes having 1–2 carbon atoms, paraformaldehyde trioxymethylene and mixtures thereof.

10. An unsaturated polyester as claimed in claim 9 wherein there is an average of two esterified residues of preformed monohydric cyclic acetal per polyester molecule.

11. An unsaturated polyester as claimed in claim 10 wherein the reactants include up to 0.45 mol of dicyclopentadiene per mol of $\alpha,\beta$ unsaturated dicarboxylic acid in toto, said dicyclopentadiene having a purity of 85–100%.

12. An air-drying coating composition whose air-drying film-forming component consists essentially of the unsaturated polyester of claim 1 and which additionally contains a sufficient quantity of inert volatile organic solvent to dissolve said polyester and to form a homogeneous single-phase coating solution thereof.

13. An air-drying coating composition whose air-drying film-forming component consists essentially of the unsaturated polyester of claim 1 and which additionally contains (a) dissolved cobalt salt and (b) a sufficient quantity of a mixture of inert volatile organic solvent and copolymerizable, ethylenically - unsaturated, normally-liquid monomer to dissolve said polyester and to form a homogeneous single-phase coating solution thereof.

14. An air-drying coating composition whose air-drying film-forming component consists essentially of the unsaturated polyester of claim 1 and which additonally contains (a) dissolved cobalt salt and (b) a sufficient quantity of copolymerizable, ethylenically-unsaturated, normally-liquid monomer to dissolve said polyester and to form a homogeneous single-phase coating solution thereof.

15. An air-drying coating composition whose air-drying film-forming component consists essentially of the unsaturated polyester of claim 10 and which additionally contains a sufficient quantity of inert volatile organic solvent to dissolve said polyester and to form a homogeneous single-phase coating solution thereof.

16. An air-drying coating composition whose air-drying film-forming component consists essentially of the unsaturated polyester of claim 10 and which additionally contains (a) dissolved cobalt salt and (b) a sufficient quantity of a mixture of inert volatile organic solvent and copolymerizable, ethylenically-unsaturated, normally-liquid monomer to dissolve said polyester and to form a homogeneous single-phase coating solution thereof.

17. An air-drying coating composition whose air-drying film-forming component consists essentially of the unsaturated polyester of claim 10 and which additionally contains (a) dissolved cobalt salt and (b) a sufficient quantity of copolymerizable, ethylenically-unsaturated, normally-liquid monomer to dissolve said polyester and to form a homogeneous single-phase coating solution thereof.

18. An air-drying coating composition whose air-drying film-forming component consists essentially of the unsaturated polyester of claim 11 and which additionally contains a sufficient quantity of inert volatile organic solvent to dissolve said polyester and to form a homogeneous single-phase coating solution thereof.

19. An air-drying coating composition whose air-drying film-forming compoinent consists essentially of the unsaturated polyester of claim 11 and which additionally contains (a) dissolved cobalt salt and (b) a sufficient quantity of a mixture of inert volatile organic solvent and copolymerizable, ethylenically - unsaturated, normally-liquid monomer to dissolve said polyester and to form a homogeneous single-phase coating solution thereof.

20. An air-drying coating composition whose air-drying film-forming component consists essentially of the unsaturated polyester of claim 11 and which additionally contains (a) dissolved cobalt salt and (b) a sufficient quantity of copolymerizable, ethylenically-unsaturated, normally-liquid monomer to dissolve said polyester and to form a homogeneous single-phase coating solution thereof.

References Cited by the Examiner

UNITED STATES PATENTS

| | | | |
|---|---|---|---|
| 2,534,305 | 12/50 | Shechter et al. | 260—867 |
| 2,671,070 | 3/54 | Knapp | 260—78.5 |
| 2,857,303 | 10/58 | Wilson | 260—867 |
| 3,058,934 | 10/62 | Ikeda | 260—22 |
| 3,074,896 | 1/63 | Duffy | 260—23 |

MURRAY TILLMAN, *Primary Examiner.*

LEON J. BERCOVITZ, *Examiner.*

UNITED STATES PATENT OFFICE
CERTIFICATE OF CORRECTION

Patent No. 3,210,441                  October 5, 1965

Arthur P. Dowling et al.

It is hereby certified that error appears in the above numbered patent requiring correction and that the said Letters Patent should read as corrected below.

Column 3, line 60, for "1 equiv. in toto." read -- .95-1.05 equiv. --; line 61, for ".95-1.05 equiv." read -- 1 equiv. in toto. --; column 4, line 74, strike out "2 mols"; column 5, line 37, strike out "2 mols (x 60)"; line 48, for "theoertical" read -- theoretical --; column 6, lines 62 and 68, and column 7, line 10, strike out 2 mols", each occurrence; column 10, line 58, strike out "1 mol"; column 14, line 17, after "paraformaldehyde" insert a comma.

Signed and sealed this 19th day of July 1966.

(SEAL)
Attest:

ERNEST W. SWIDER                  EDWARD J. BRENNER
Attesting Officer                  Commissioner of Patents